United States Patent
Owaki et al.

(10) Patent No.: US 8,458,551 B2
(45) Date of Patent: Jun. 4, 2013

(54) VERIFICATION DEVICE, VERIFICATION METHOD, AND VERIFICATION PROGRAM

(75) Inventors: Takeshi Owaki, Kawasaki (JP);
Takaharu Ishizuka, Kawasaki (JP);
Toshikazu Ueki, Kawasaki (JP);
Takashi Yamamoto, Kawasaki (JP);
Atsushi Morosawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 171 days.

(21) Appl. No.: 12/926,218

(22) Filed: Nov. 2, 2010

(65) Prior Publication Data
US 2011/0047431 A1    Feb. 24, 2011

Related U.S. Application Data

(63) Continuation of application No. PCT/JP2008/059142, filed on May 19, 2008.

(51) Int. Cl.
*H04L 1/18* (2006.01)
*G08C 25/02* (2006.01)

(52) U.S. Cl.
USPC ............ 714/748; 714/799; 370/235; 370/474

(58) Field of Classification Search
USPC .................. 714/773, 748–751, 799; 370/235, 370/474
See application file for complete search history.

(56) References Cited

U.S. PATENT DOCUMENTS

| | | | |
|---|---|---|---|
| 2004/0098655 A1 | 5/2004 | Sharma | |
| 2005/0094647 A1* | 5/2005 | Hata et al. | 370/395.52 |

FOREIGN PATENT DOCUMENTS

| | | |
|---|---|---|
| JP | 5-304515 | 11/1993 |
| JP | 7-123134 | 5/1995 |
| JP | 10-301860 | 11/1998 |
| JP | 2000-197626 | 7/2000 |
| JP | 2002-9883 | 1/2002 |
| JP | 2002-141964 | 5/2002 |
| JP | 2004-135013 | 4/2004 |
| JP | 2004-173271 | 6/2004 |
| JP | 2004-357284 | 12/2004 |

OTHER PUBLICATIONS

International Search Report for PCT/JP2008/059142, mailed Jul. 29, 2008.
Japanese Office Action dated Apr. 17, 2012 issued in corresponding Japanese Patent Application No. 2010-512856.

* cited by examiner

*Primary Examiner* — Guy Lamarre
(74) *Attorney, Agent, or Firm* — Staas & Halsey LLP

(57) ABSTRACT

A verification device includes a data verifying unit that verifies whether data in a packet has an error using a first or a second verification mode, a packet generating unit that generates a packet in accordance with a first packet generation mode or a second packet generation mode respectively corresponding to the first and the second verification modes, a failure monitoring unit that monitors a failure of a transmission line that requires a switching of the verification mode, a switching packet transmitting unit that transmits to a destination device, a switching packet for informing the switching of the verification mode used by the data verifying unit when the failure monitoring unit detects a failure or a removal of a failure, a generation mode switching unit that switches the generation mode, and a verification mode switching unit that switches the verification mode to the one informed by the switching packet.

6 Claims, 13 Drawing Sheets

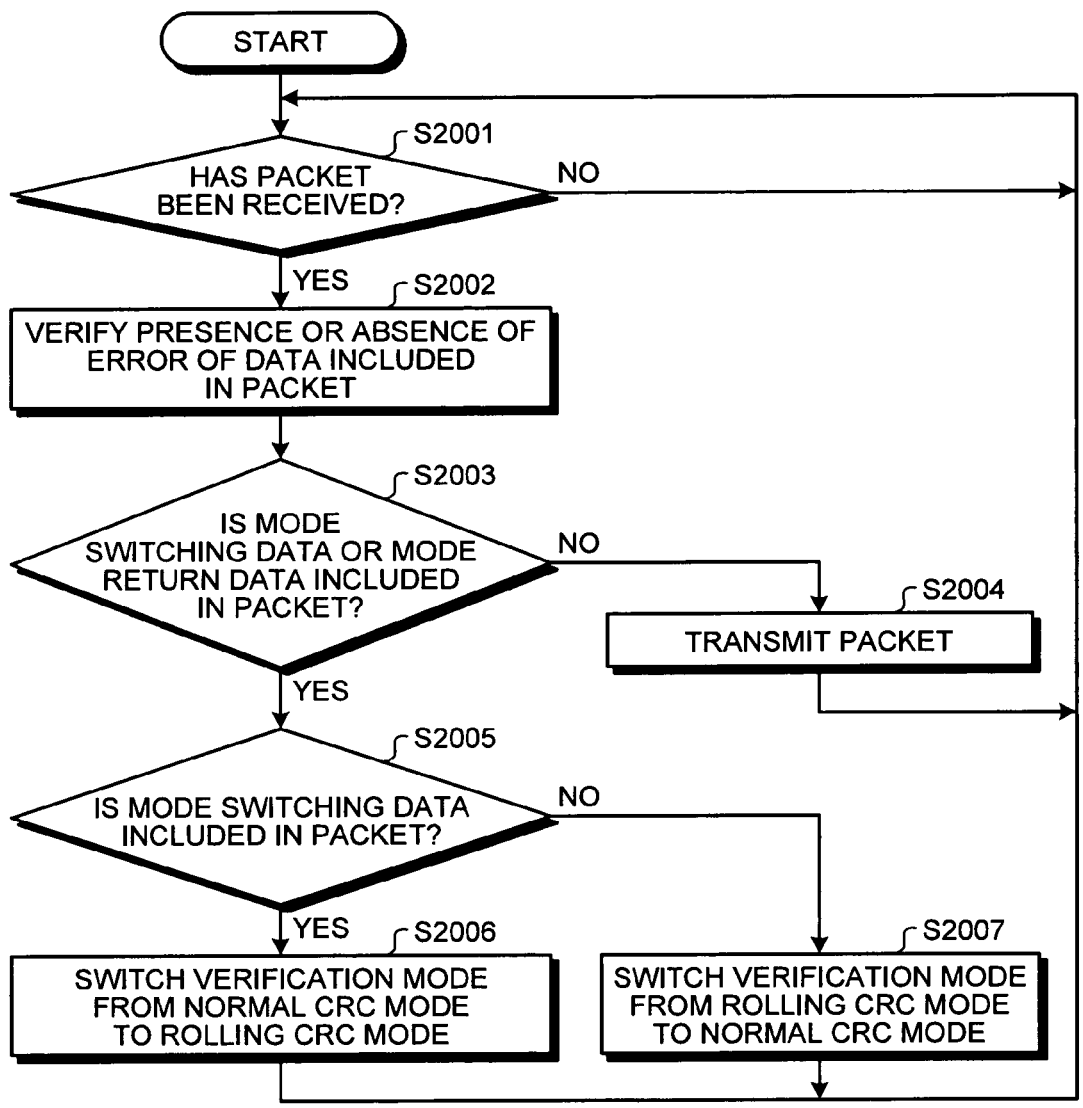

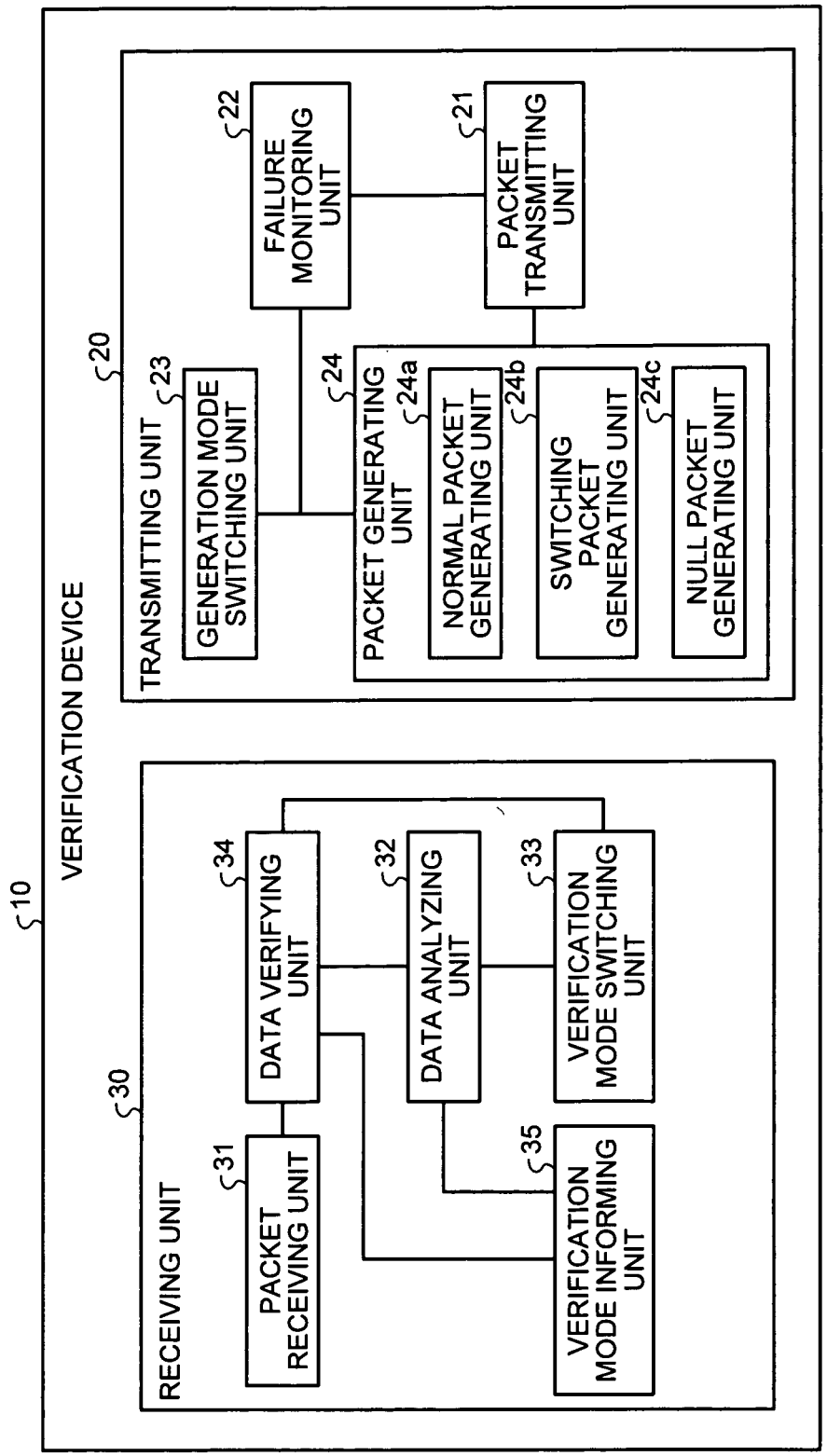

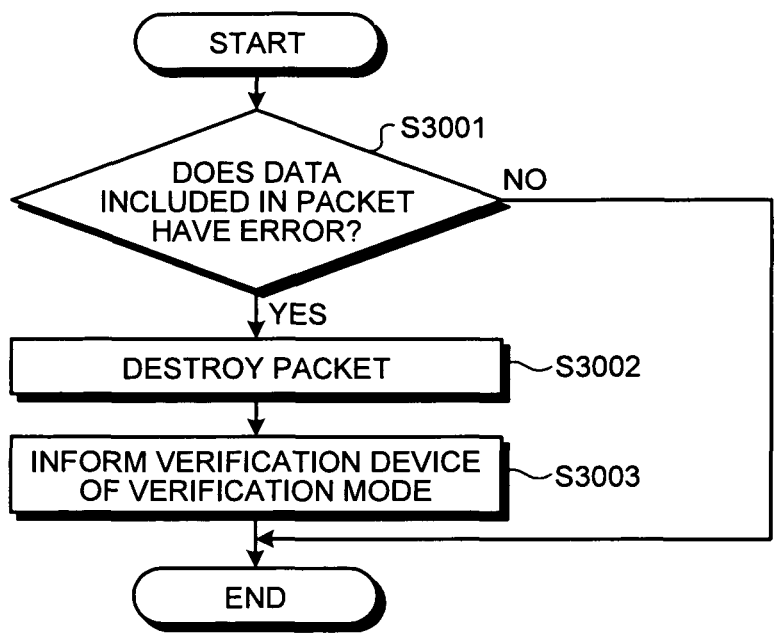
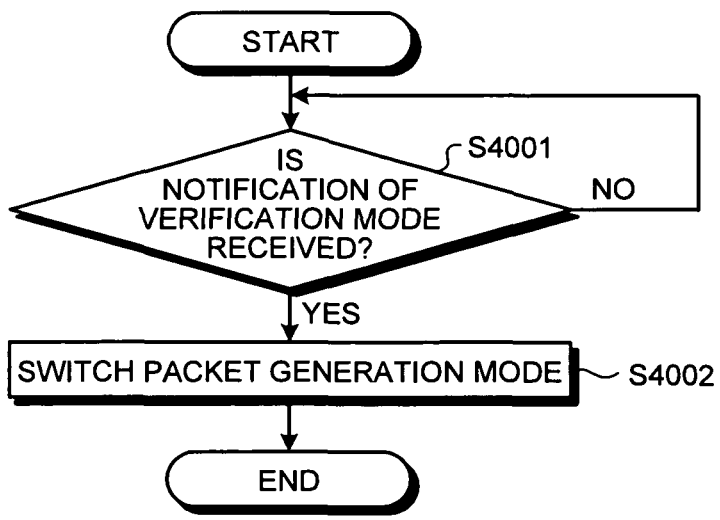

VERIFICATION DEVICE, VERIFICATION METHOD, AND VERIFICATION PROGRAM

CROSS-REFERENCE TO RELATED APPLICATION

This application is a continuation of International Application No. PCT/JP2008/059142, filed on May 19, 2008, the entire contents of which are incorporated herein by reference.

FIELD

The embodiments discussed herein are directed to a verification device, a verification method, and a verification program.

BACKGROUND

There has conventionally been a CRC (Cyclic Redundancy Check) method as a method for detecting an error of data. The CRC method includes a "normal CRC mode" and a "rolling CRC mode". The method has been known as disclosed in, for example, U.S. Patent Application Publication 2004/0098655, Japanese Laid-open Patent Publication No. 2004-357284, Japanese Laid-open Patent Publication No. 07-123134, Japanese Laid-open Patent Publication No. 2000-197626, and Japanese Laid-open Patent Publication No. 10-301860.

The "normal CRC mode" is a verification mode for verifying the presence or absence of error of data included in a packet by using data and check bit included in the packet. On the other hand, the "rolling CRC mode" is a verification mode for verifying the presence or absence of error of data included in a first packet received immediately before a second packet by using data included in the second packet and data and check bit included in the first packet.

However, a conventional technology has a problem in that a detection accuracy for detecting an error of data is low and a latency time increases.

Packet communication requires decreasing the bit length of check bit included in one packet and increasing the amount of data included in the packet. However, when the bit length of check bit used in data error detection is the same, the "normal CRC mode" has a low detection accuracy in the detection of data error as compared with the "rolling CRC mode". For example, the normal CRC mode may not detect data corruption caused by the partial disconnection of a packet transmission line.

The "rolling CRC mode" has a high error detection rate for a packet as compared with the normal CRC mode. However, the "rolling CRC mode" has a problem in that a verification time from the reception of a packet to the error verification of data included in the packet is longer than that of a "normal CRC mode" and a latency time increases because packet error detection can be performed only after receiving a plurality of packets.

SUMMARY

According to one aspect of the present invention, a verification device includes: a data verifying unit that verifies a presence or absence of an error of data included in a packet by using one of a first verification mode for verifying a presence or absence of an error of data included in a first packet received and a second verification mode for verifying a presence or absence of an error of data included in a second packet received immediately before the first packet; a packet generating unit that generates a packet by using one of a first packet generation mode for generating a packet corresponding to the first verification mode and a second packet generation mode for generating a packet corresponding to the second verification mode; a failure monitoring unit that monitors whether a failure of a transmission line that requires a switching of the verification mode occurs; a switching packet transmitting unit that transmits, to a first verification device, which is a packet transmission destination, a switching packet for informing of the switching of the verification mode that is used by the data verifying unit when the failure monitoring unit detects an occurrence of a failure or a removal of a failure; a generation mode switching unit that switches the generation mode that is used by the packet generating unit; and a verification mode switching unit that switches the verification mode that is used by the data verifying unit to the verification mode informed by the switching packet when receiving the switching packet.

According to another aspect of the present invention, a verification method includes: verifying a presence or absence of an error of data included in a packet by using one of a first verification mode for verifying a presence or absence of an error of data included in a first packet and a second verification mode for verifying a presence or absence of an error of data included in a second packet received immediately before the first packet; generating a packet by using one of a first packet generation mode for generating a packet corresponding to the first verification mode and a second packet generation mode for generating a packet corresponding to the second verification mode; monitoring whether a failure of a transmission line that requires a switching of the verification mode occurs; transmitting a switching packet including data for switching the verification mode that is used at the verifying to a first verification device, which is a packet transmission destination, when an occurrence of a failure or a removal of a failure is detected in the monitoring; switching the generation mode that is used at the generating when the switching packet is transmitted at the transmitting; and switching the verification mode that is used at the verifying when the switching packet is received.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 7 is a flowchart illustrating a flow of a data verification process that is performed by the verification device according to the first embodiment;

FIG. 8 is a block diagram illustrating the configuration of a verification device according to a second embodiment;

FIG. 9 is a flowchart illustrating a flow of a data verification process that is performed by the verification device according to the second embodiment;

FIG. 10 is a flowchart illustrating a flow of a generation mode switching process that is performed by the verification device according to the second embodiment;

DESCRIPTION OF EMBODIMENT(S)

Preferred embodiments of the present invention will be explained with reference to accompanying drawings. The present invention is not limited to the embodiments explained below. Hereinafter, it will be explained about a verification device to which the present invention is applied as an embodiment.

[a] First Embodiment

In the first embodiment, it will be sequentially explained about the main terms that are used in the first embodiment, the overview and feature of a verification device according to the first embodiment, and the configuration and process flow of the verification device. Finally, it will be explained about effects of the first embodiment.

Main Terms of First Embodiment

First, it will be explained about main terms that are used in the first embodiment. A "normal CRC mode" in the first embodiment means a verification mode for verifying, when receiving a packet, the presence or absence of error of the received packet by using data and check bit included in the packet and a generation mode for generating a packet corresponding to the verification mode.

A "rolling CRC mode" in the first embodiment means a verification mode for verifying the presence or absence of error of the data of a first packet when receiving a second packet after receiving the first packet by using data included in the second packet and data and check bit included in the first packet, and a generation mode for generating a packet corresponding to the verification mode.

Overview and Feature of Verification Device of First Embodiment

Figure 1A:
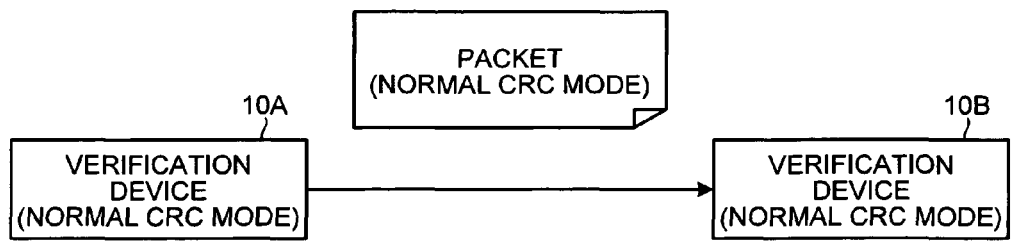
FIGS. 1A to 1C are diagrams explaining the overview and feature of a verification device according to a first embodiment.
Figure 1B:
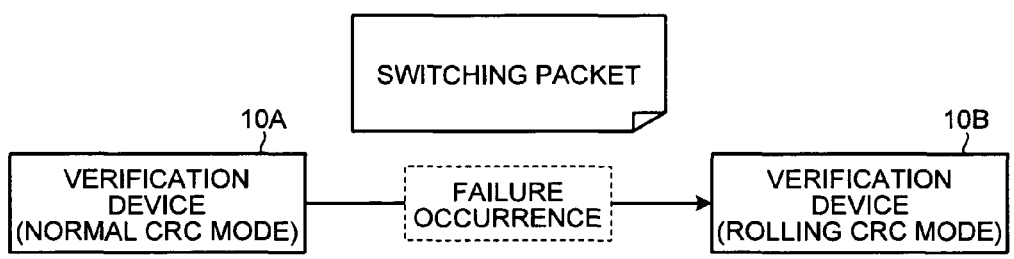
Figure 1C:
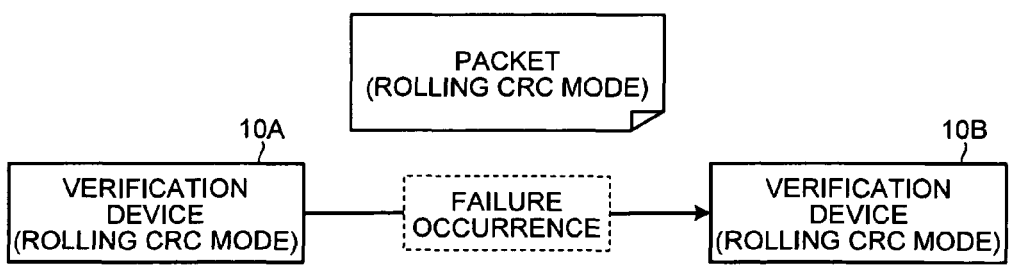

Next, it will be explained about the overview and feature of a verification device according to the first embodiment with reference to FIGS. 1A to 1C. FIGS. 1A to 1C are diagrams explaining the overview and feature of operations that are performed by a verification device according to the first embodiment.

In brief, the verification device according to the first embodiment transmits a generated packet and verifies the presence or absence of error of data included in a received packet. Primary feature of the verification device according to the first embodiment is that it suppresses the increase of a latency time while maintaining detection accuracy as needed.

To explain using a specific example, as illustrated in FIG. 1A, a verification device 10A according to the first embodiment generates a packet in accordance with the "normal CRC mode" and transmits the packet to a verification device 10B according to the first embodiment. Moreover, the verification device 10B verifies the presence or absence of error of data included in the packet received from the verification device 10A in accordance with the "normal CRC mode".

In this case, as illustrated in FIG. 1B, when the verification device 10A detects a failure on a transmission line such as the partial disconnection of the transmission line that requires the switching of a verification mode, the verification device 10A generates a switching packet for switching a verification mode for verifying the presence or absence of error of data and transmits the switching packet to the verification device 10B.

The verification device 10B receives the switching packet, and then switches the verification mode that is executed by itself from the "normal CRC mode" to the "rolling CRC mode".

Next, as illustrated in FIG. 1C, the verification device 10A switches a generation mode for generating a packet from the "normal CRC mode" to the "rolling CRC mode". After that, the verification device 10A generates a packet according to the "rolling CRC mode" and transfers the packet to the verification device 10B.

Because of this, the verification device according to the first embodiment can suppress the increase of a latency time while maintaining a detection accuracy as needed.

Configuration of Verification Device

Figure 2:
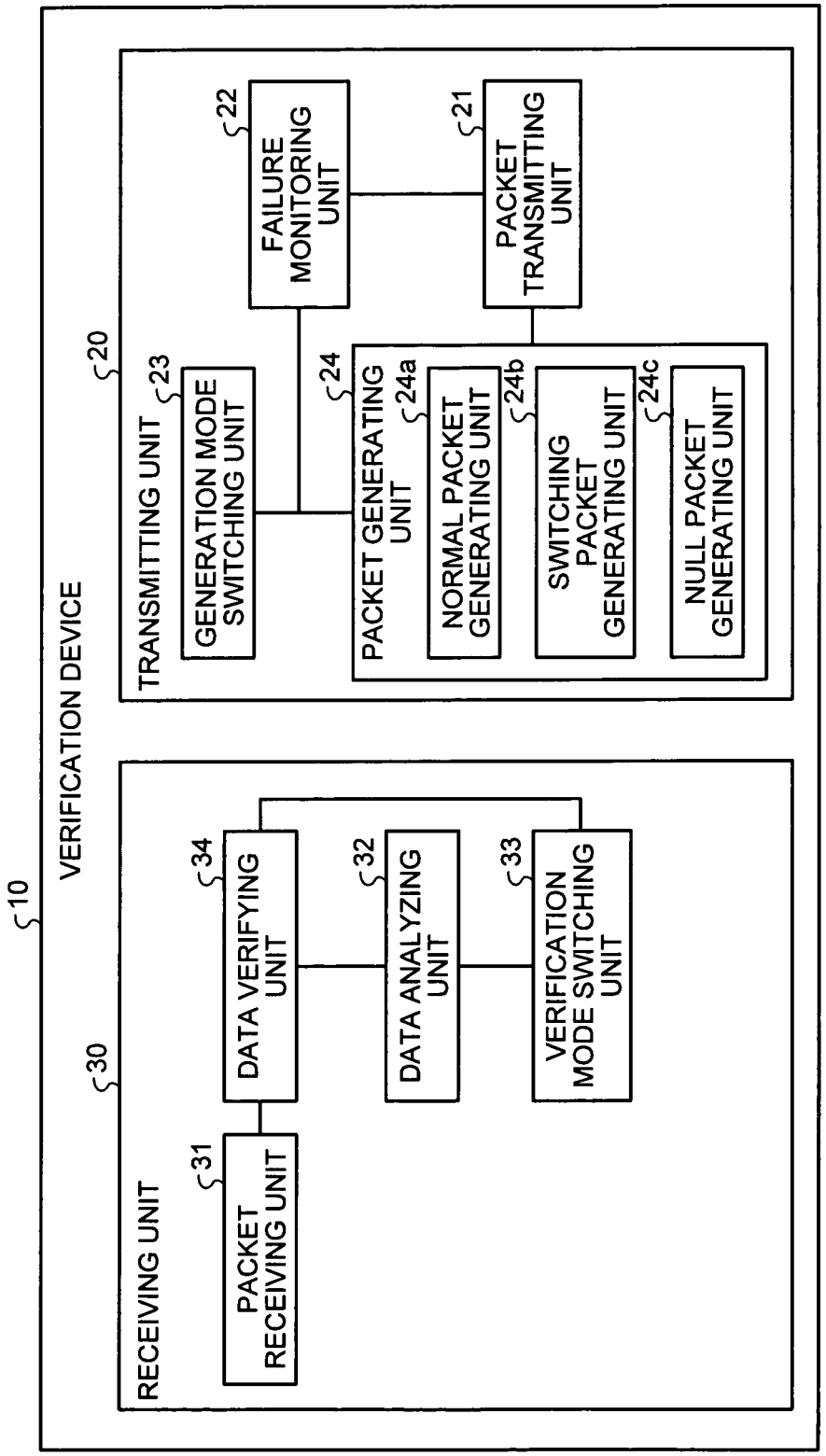
FIG. 2 is a block diagram of the verification device according to the first embodiment.
Figure 4:
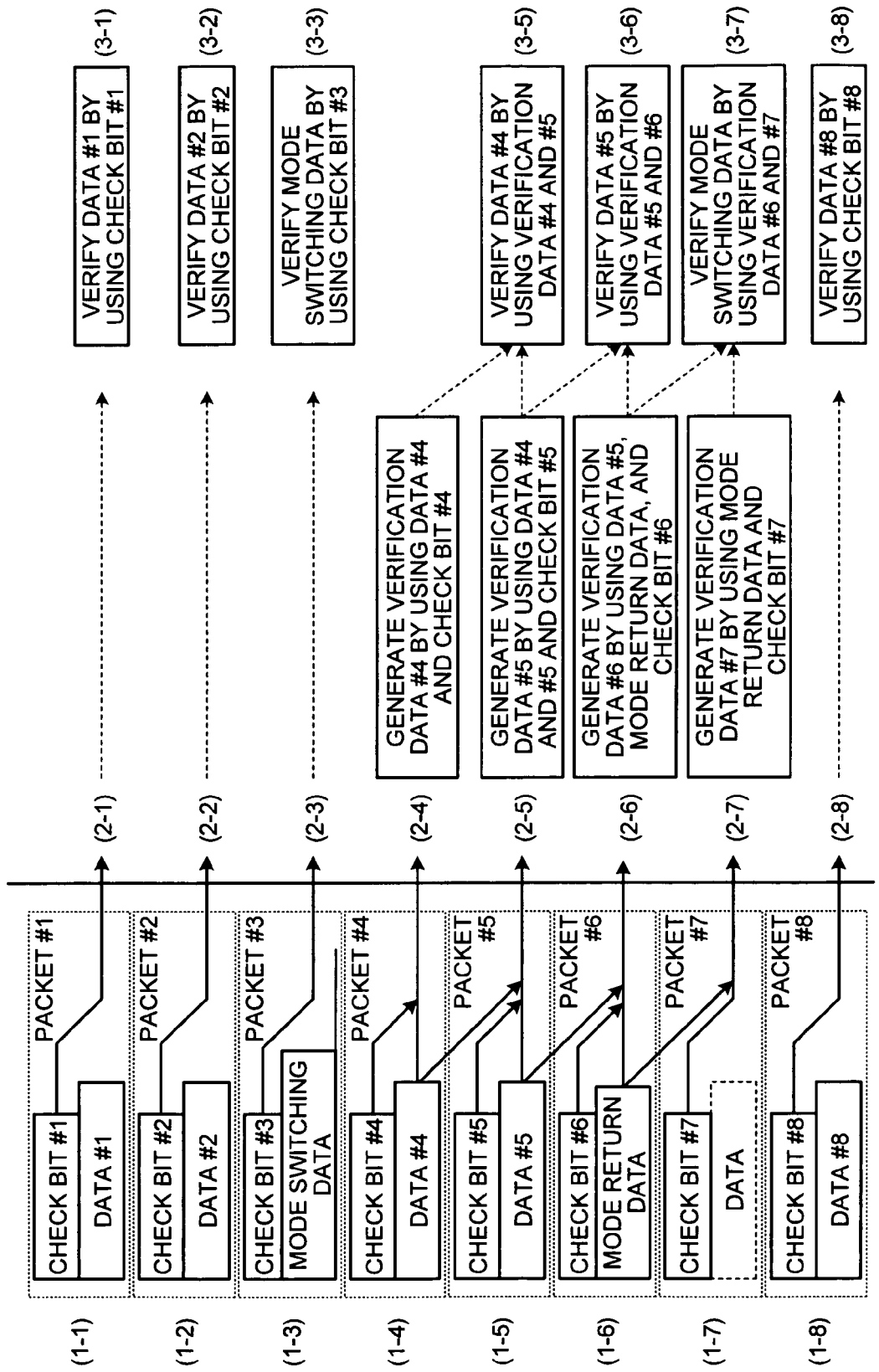
FIG. 4 is a diagram explaining an example of a process that is performed by the verification device according to the first embodiment.

Next, it will be explained about the configuration of the verification device illustrated in FIGS. 1A to 1C with reference to FIGS. 2 and 4. FIG. 2 is a functional block diagram illustrating the configuration of a verification device 10 according to the first embodiment. FIG. 4 is a diagram explaining an example of a process that is performed by the verification device 10 according to the first embodiment. As illustrated in FIG. 2, the verification device 10 includes a transmitting unit 20 and a receiving unit 30.

Transmitting Unit

The transmitting unit 20 includes a packet transmitting unit 21, a failure monitoring unit 22, a generation mode switching unit 23, and a packet generating unit 24.

The packet transmitting unit 21 is connected to a transmission line and transmits a packet to the transmission line. Specifically, the packet transmitting unit 21 includes a single port or a plurality of ports and transmits a packet received from the packet generating unit 24 toward the transmission line via the port.

The failure monitoring unit 22 monitors whether a failure that requires the switching of a verification mode occurs. Specifically, the failure monitoring unit 22 monitors the condition of the transmission line to which the transmitting unit 20 is connected, and determines whether the transmission line has a failure that seems to require the switching of a verification mode.

On determining that the transmission line does not have a failure that requires the switching of a verification mode, the failure monitoring unit 22 outputs a normal signal indicating that the transmission line does not have a failure to the packet generating unit 24. On determining that the transmission line has a failure that requires the switching of a verification mode, the failure monitoring unit 22 outputs a failure signal indicating that the transmission line has a failure to the packet generating unit 24.

When the packet generating unit 24 generates a switching packet for switching a verification mode for verifying the presence or absence of error of data, the generation mode switching unit 23 instructs the packet generating unit 24 to switch a generation mode that is used by the packet generating unit 24.

The packet generating unit 24 generates a packet to be transferred to the outside via the transmission line, and includes a normal packet generating unit 24a, a switching packet generating unit 24b, and a null packet generating unit 24c.

The normal packet generating unit 24a generates a packet in accordance with the "normal CRC mode" or the "rolling CRC mode". Specifically, when receiving a normal signal from the failure monitoring unit 22, every time a packet is stored in a buffer, by using data included in the stored packet, the normal packet generating unit 24a generates, in accordance with a "normal CRC mode", check bit that are used when the verification device 10B that is a packet transmission destination verifies the data. Then, the normal packet generating unit 24a generates a packet by giving the generated check bit to the data included in the stored packet, and transmits the generated packet to the verification device 10B via the transmitting unit 20.

Figure 3:
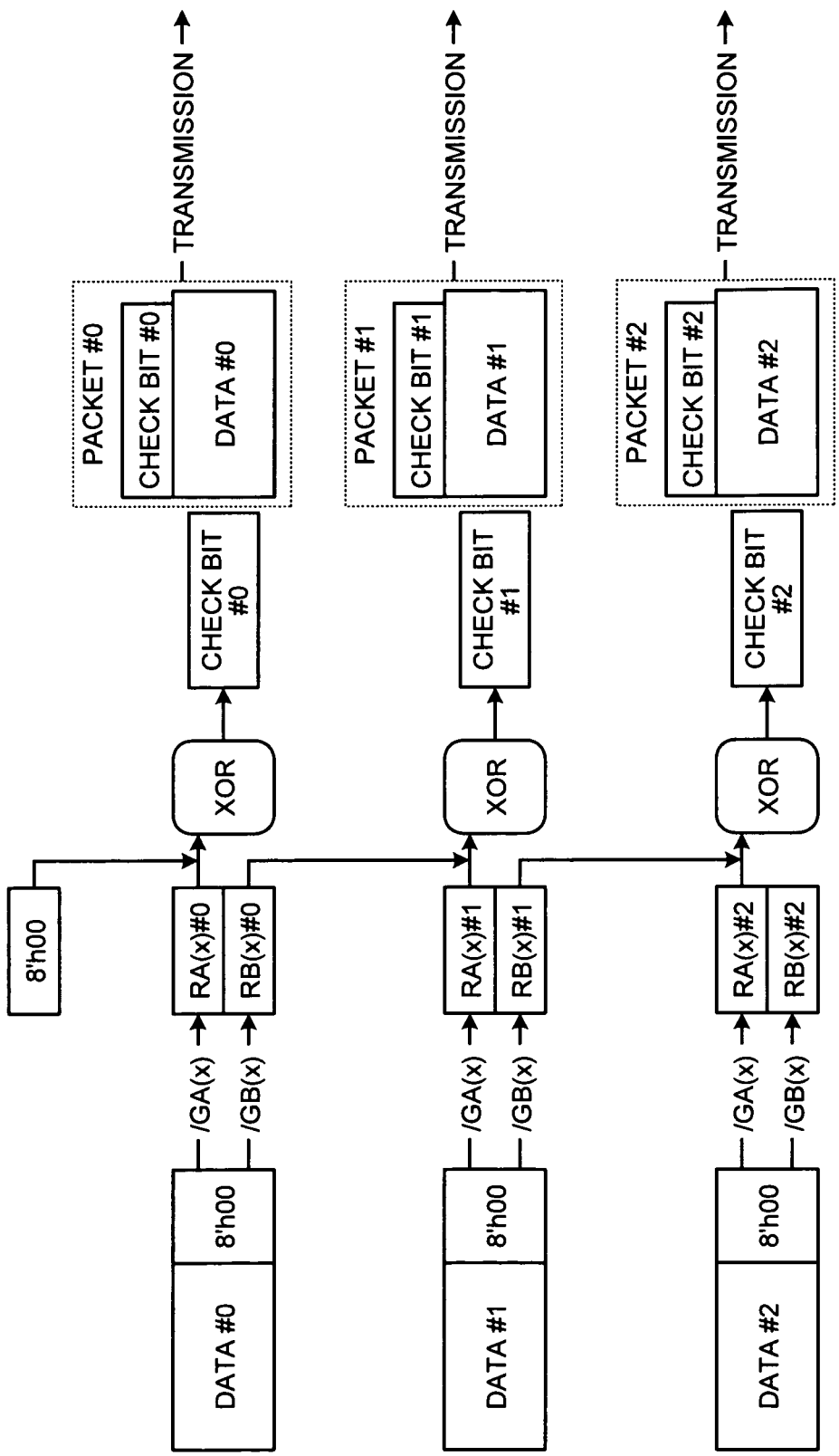
FIG. 3 is a diagram explaining a packet generation method according to a rolling CRC mode.

Moreover, when receiving a failure signal from the failure monitoring unit 22, every time a packet is stored in a buffer, by using data included in the stored packet and data included in a packet transmitted just before that (hereinafter, "pre-transmitted packet"), the normal packet generating unit 24a generates check bit that are used when the verification device 10B that is a packet transmission destination verifies the data and the data included in the pre-transmitted packet in accordance with a "rolling CRC mode" (see FIG. 3). Then, the normal packet generating unit 24a generates a packet by giving the generated check bit to the data included in the stored packet, and transmits the generated packet to the verification device 10B via the transmitting unit 20.

The switching packet generating unit 24b generates a switching packet that includes data for switching a verification mode to the verification device that is a packet transmission destination in accordance with the monitoring result by the failure monitoring unit 22. Specifically, when receiving a normal signal from the failure monitoring unit 22, the switching packet generating unit 24b generates a packet that includes mode switching data for switching a verification mode, which is performed by the verification device 10B that is a packet transmission destination, from the "normal CRC mode" to the "rolling CRC mode", and stores the generated packet in the buffer.

Next, the switching packet generating unit 24b generates, in accordance with the "normal CRC mode", check bit that are used when the verification device 10B that is a packet transmission destination verifies the mode switching data by using the mode switching data included in the stored packet. Then, the switching packet generating unit 24b generates a switching packet by giving the generated check bit to the mode switching data, and transmits the generated switching packet to the verification device 10B via the transmitting unit 20.

Moreover, when receiving a normal signal from the failure monitoring unit 22, the switching packet generating unit 24b generates a packet that includes mode return data for switching a verification mode, which is performed by the verification device 10B that is a packet transmission destination, from the "rolling CRC mode" to the "normal CRC mode", and stores the generated packet in the buffer.

Next, the switching packet generating unit 24b generates, by using the mode return data included in the stored packet and data included in a pre-transmitted packet transmitted, check bit that are used when the verification device 10B that is a packet transmission destination verifies the data included in the pre-transmitted packet and the mode switching data in accordance with the "rolling CRC mode". Then, the switching packet generating unit 24b generates a return packet by giving the generated check bit to the mode return data, and transmits the generated return packet to the verification device 10B via the transmitting unit 20.

The null packet generating unit 24c generates a null packet that has null data, in other words, in which valid data is not included. Specifically, when the switching packet generating unit 24b transmits the return packet to the verification device 10B, the null packet generating unit 24c generates a packet having null data and stores the generated packet in the buffer.

Next, the null packet generating unit 24c generates check bit that are used when the verification device 10B that is a packet transmission destination verifies the mode switching data, in accordance with the "rolling CRC mode" by using the mode return data that is data included in the pre-transmitted packet. Then, the null packet generating unit 24c generates a null packet by giving the generated check bit to the null data, and transmits the generated null packet to the verification device 10B via the transmitting unit 20.

Hereinafter, with reference to FIG. 4, it will be specifically explained about a process that is performed by the generation mode switching unit 23, the normal packet generating unit 24a, the switching packet generating unit 24b, and the null packet generating unit 24c of the verification device 10A when a packet is transmitted from the verification device 10A to the verification device 10B.

When a packet is stored in the buffer of the verification device 10A while the packet generating unit 24 of the verification device 10A receives a normal signal from the failure monitoring unit 22, the normal packet generating unit 24a generates check bit #1 by using data #1 as illustrated in (1-1) of FIG. 4. Then, the normal packet generating unit 24a generates a packet #1 by giving the check bit #1 generated using the "normal CRC mode" to the data #1, and transmits the generated packet to the verification device 10B via the transmitting unit 20.

Next, the normal packet generating unit 24a generates check bit #2 by using data #2 in accordance with a "normal CRC mode" as illustrated in (1-2) of FIG. 4. Then, the normal packet generating unit 24a generates a packet #2 by giving the check bit #2 generated using the "normal CRC mode" to the data #2, and transmits the generated packet to the verification device 10B via the transmitting unit 20.

Next, assume that the packet generating unit 24 of the verification device 10A receives a failure signal from the failure monitoring unit 22 of the verification device 10A. At this time, as illustrated in (1-3) of FIG. 4, the switching packet generating unit 24b of the verification device 10A generates mode switching data indicative of information for switching a verification mode from a "normal CRC mode" to a "rolling CRC mode" and generates check bit #3 by using the generated mode switching data. Then, the switching packet generating unit 24b generates a packet #3 by giving the check bit #3 generated using the "normal CRC mode" to the mode switching data, and transmits the generated packet to the verification device 10B via the transmitting unit 20. In this case, the packet #3 is a switching packet.

Then, the generation mode switching unit 23 switches the generation mode of the packet generating unit 24 from the "normal CRC mode" to the "rolling CRC mode".

Next, as illustrated in (1-4) of FIG. 4, the normal packet generating unit 24a generates check bit #4 by using data #4 in accordance with the "rolling CRC mode". Then, the normal packet generating unit 24a generates a packet #4 that is obtained by giving the check bit #4 generated using the "rolling CRC mode" to the data #4, and transmits the generated packet to the verification device 10B via the transmitting unit 20.

Next, as illustrated in (1-5) of FIG. 4, the normal packet generating unit 24a generates check bit #5 by using the data #4 and data #5 in accordance with the "rolling CRC mode". Then, the normal packet generating unit 24a generates a packet #5 that is obtained by giving the check bit #5 generated using the "rolling CRC mode" to the data #5, and transmits the generated packet to the verification device 10B via the transmitting unit 20.

Next, assume that the packet generating unit 24 begins to receive a normal signal from the failure monitoring unit 22. At this time, as illustrated in (1-6) of FIG. 4, the switching packet generating unit 24b generates mode return data indicative of information for returning a verification mode from the "rolling CRC mode" to the "normal CRC mode" and generates check bit #6 by using the data #5 in accordance with the "rolling CRC mode". Then, the switching packet generating unit 24b generates a packet #6 by giving the check bit #6 generated using the "rolling CRC mode" to the mode return data, and transmits the generated packet to the verification device 10B via the transmitting unit 20.

Next, as illustrated in (1-7) of FIG. 4, the null packet generating unit 24c generates check bit #7 by using the mode return data in accordance with the "rolling CRC mode". Then, the null packet generating unit 24c generates a packet #7 by using the check bit #7 generated using the "rolling CRC mode", and transmits the generated packet to the verification device 10B via the transmitting unit 20. In this case, the packet #7 is a null packet which contains no data.

Then, the generation mode switching unit 23 switches the generation mode of the packet generating unit 24 from the "rolling CRC mode" to the "normal CRC mode".

Next, as illustrated in (1-8) of FIG. 4, the normal packet generating unit 24a generates check bit #8 by using data #8 in accordance with the "normal CRC mode". Then, the normal packet generating unit 24a generates a packet #8 by giving the check bit #8 generated using the "normal CRC mode" to the data #8, and transmits the generated packet to the verification device 10B via the transmitting unit 20.

Receiving Unit

Returning to the explanation of FIG. 2, the receiving unit 30 includes a packet receiving unit 31, a data analyzing unit 32, a verification mode switching unit 33, and a data verifying unit 34.

The packet receiving unit 31 receives a packet from the transmission line. Specifically, the packet receiving unit 31 includes a single port or a plurality of ports that is connected to the transmission line, and outputs a packet received from the transmission line via the port to the data verifying unit 34.

The data analyzing unit 32 analyzes data included in the received packet. Specifically, when receiving the packet from the data verifying unit 34, the data analyzing unit 32 analyzes data included in the packet and determines whether mode switching data or mode return data is included in the packet.

On determining that the mode switching data and the mode return data are not included in the packet, the data analyzing unit 32 transmits the packet to a data processing unit of a data processor or the like that incorporates the verification device 10. When the verification device 10 is incorporated in a relay device such as a router that relays a packet, the data analyzing unit 32 may transmit data included in a packet to the packet generating unit 24.

On determining that the mode switching data is included in the packet, the data analyzing unit 32 outputs a mode switching signal, which indicates information for switching a verification mode from the "normal CRC mode" to the "rolling CRC mode", to the verification mode switching unit 33.

Moreover, when the mode return data is included in the packet, the data analyzing unit 32 outputs a mode return signal, which indicates information for returning the verification mode from the "rolling CRC mode" to the "normal CRC mode", to the verification mode switching unit 33.

When receiving a switching packet, the verification mode switching unit 33 switches the verification mode of the data verifying unit 34.

Specifically, when receiving the mode switching signal from the data analyzing unit 32, the verification mode switching unit 33 controls the data verifying unit 34 in such a manner that the verification mode is switched from data verification using the "normal CRC mode" to data verification using the "rolling CRC mode". Hereinafter, this control is described as "switching control". On the other hand, when receiving the mode return signal from the data analyzing unit 32, the verification mode switching unit 33 controls the data verifying unit 34 in such a manner that the verification mode is returned from the data verification using the "rolling CRC mode" to the data verification using the "normal CRC mode". Hereinafter, this control is described as "return control".

The data verifying unit 34 verifies the presence or absence of error of data included in the packet received from the packet receiving unit 31 by using the "normal CRC mode" or the "rolling CRC mode".

Specifically, when receiving the mode switching signal from the data analyzing unit 32, the data verifying unit 34 verifies the presence or absence of error of the data included in the received packet by using the check bit included in the packet received from the verification device 10A that is a packet transmission source.

Figure 5:
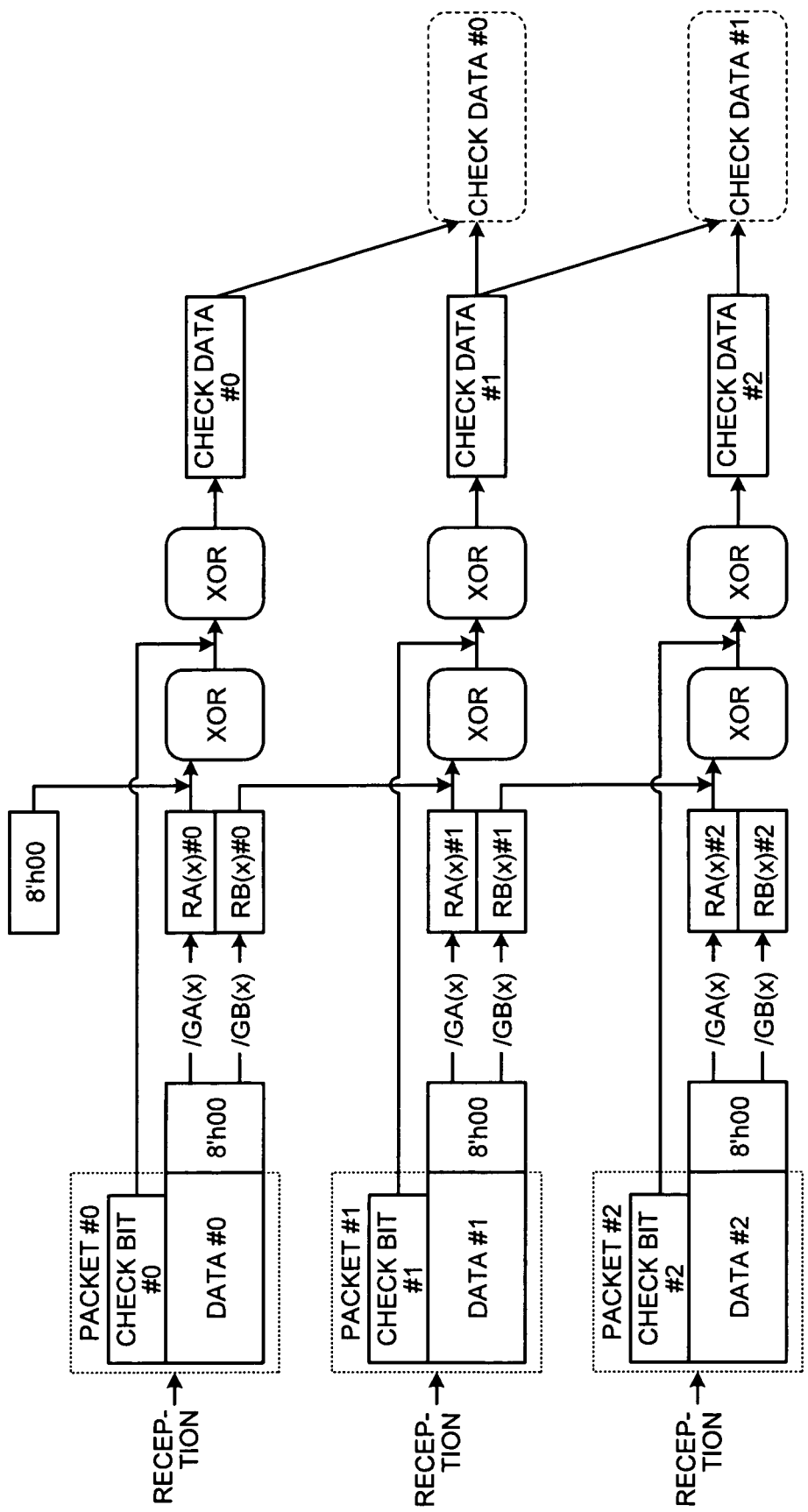
FIG. 5 is a diagram explaining a packet verification method according to a rolling CRC mode.

Moreover, when receiving the mode return signal from the data analyzing unit 32, the data verifying unit 34 generates, by using the check bit and data included in the packet received from the verification device 10A that is a packet transmission source and the data included in the packet received just before that (hereinafter, "pre-received packet"), verification data for verifying the presence or absence of error of the data included in the pre-received packet (see FIG. 5).

Next, the data verifying unit 34 verifies the presence or absence of error of the data included in the received packet by using the verification data which is currently generated (hereinafter "presently-generated verification data") and the verification data (hereinafter, "pre-generated verification data") which is generated just before the presently-generated verification data in accordance with the "rolling CRC mode" (see FIG. 5).

On determining that the data included in the packet does not have an error, the data verifying unit 34 transmits the packet to the data analyzing unit 32. On determining that the data included in the packet has an error, the data verifying unit 34 destroys the packet.

Hereinafter, it is specifically explained about a process that is performed by the data verifying unit 34 of the verification device 10B when a packet is transmitted from the verification device 10A to the verification device 10B by using an example illustrated in FIG. 4. Moreover, it will be explained about a process for verifying the presence or absence of error of data included in the packet received from the packet receiving unit 31.

As illustrated in (3-1) of FIG. 4, when receiving the packet #1 from the verification device 10A, the data verifying unit 34 verifies the presence or absence of error of the data #1 by using the check bit #1 included in the packet #1 in accordance with the "normal CRC mode".

Next, as illustrated in (3-2) of FIG. 4, when receiving the packet #2 from the verification device 10A, the data verifying unit 34 verifies the presence or absence of error of the data #2 by using the check bit #2 included in the packet #2 in accordance with the "normal CRC mode".

Next, as illustrated in (3-3) of FIG. 4, when receiving the packet #3 from the verification device 10A, the data verifying unit 34 verifies the presence or absence of error of the data (i.e., mode switching data) included in the packet #3 by using the check bit #3 and data included in the packet #3 in accordance with the "normal CRC mode".

In (1-3) of FIG. 4, the verification device 10A generates and transmits the "mode switching data". Therefore, in (2-3) of FIG. 4, the data analyzing unit 32 of the verification device 10B detects that the mode switching data is included in the packet #3 received from the verification device 10A. Then, the, data analyzing unit 32 generates a mode switching signal and transmits the signal to the verification mode switching unit 33. The verification mode switching unit 33 switches the verification mode of the data verifying unit 34 from the "normal CRC mode" to the "rolling CRC mode" in accordance with the mode switching signal.

Next, as illustrated in (2-4) of FIG. 4, when receiving the packet #4 from the verification device 10A, the data verifying unit 34 generates verification data #4 for verifying the presence or absence of error of the data #4 by using the check bit #4 and the data #4 included in the packet #4 in accordance with the "rolling CRC mode". Moreover, because the verification mode is switched to the "rolling CRC mode" in (2-4), the data verifying unit 34 does not perform verification on the packet #4 at this step.

Next, as illustrated in (2-5) of FIG. 4, when receiving the packet #5 from the verification device 10A, the data verifying unit 34 generates verification data #5 for verifying the presence or absence of error of the data #4 and the data #5 by using the check bit #5 and the data #5 included in the packet #5 and the data #4 included in the packet #4 in accordance with the "rolling CRC mode". Then, as illustrated in (3-5) of FIG. 4, the data verifying unit 34 verifies the presence or absence of error of the data #4 by using the verification data #4 and the verification data #5 in accordance with the "rolling CRC mode".

Next, as illustrated in (2-6) of FIG. 4, when receiving the packet #6 from the verification device 10A, the data verifying unit 34 generates verification data #6 for verifying the presence or absence of error of the data #5 and the data included in the packet #6 by using the check bit #6 and data included in the packet #6 and the data #5 included in the packet #5 in accordance with the "rolling CRC mode". Then, as illustrated in (3-6) of FIG. 4, the data verifying unit 34 verifies the presence or absence of error of the data #5 by using the verification data #5 and the verification data #6 in accordance with the "rolling CRC mode".

Next, as illustrated in (2-7) of FIG. 4, when receiving the packet #7, the data verifying unit 34 generates verification data #7 for verifying the presence or absence of error of the data included in the packet #6 by using the check bit #7 included in the packet #7 and the data included in the packet #6 in accordance with the "rolling CRC mode". Then, as illustrated in (3-7) of FIG. 4, the data verifying unit 34 verifies the presence or absence of error of the data included in the packet #6 by using the verification data #6 and the verification data #7 in accordance with the "rolling CRC mode".

The verification device 10A generates and transmits the mode return data in (1-6). Therefore, the data analyzing unit 32 of the verification device 10B detects that the mode return data is included in the packet #6. The data analyzing unit 32 generates a mode return signal and transmits the signal to the verification mode switching unit 33. The verification mode switching unit 33 returns the verification mode of the data verifying unit 34 from the "rolling CRC mode" to the "normal CRC mode" in accordance with the mode return signal. Moreover, because the packet #7 is generated by giving the check bit #7 to null data, the presence or absence of error of the data may not be verified.

Next, as illustrated in (3-8) of FIG. 4, when receiving the packet #8 from the verification device 10A, the data verifying unit 34 that is returned to the "normal CRC mode" verifies the presence or absence of error of the data #8 by using the check bit #8 and the data #8 included in the packet #8 in accordance with the "normal CRC mode".

Process by Verification Device

Figure 6:
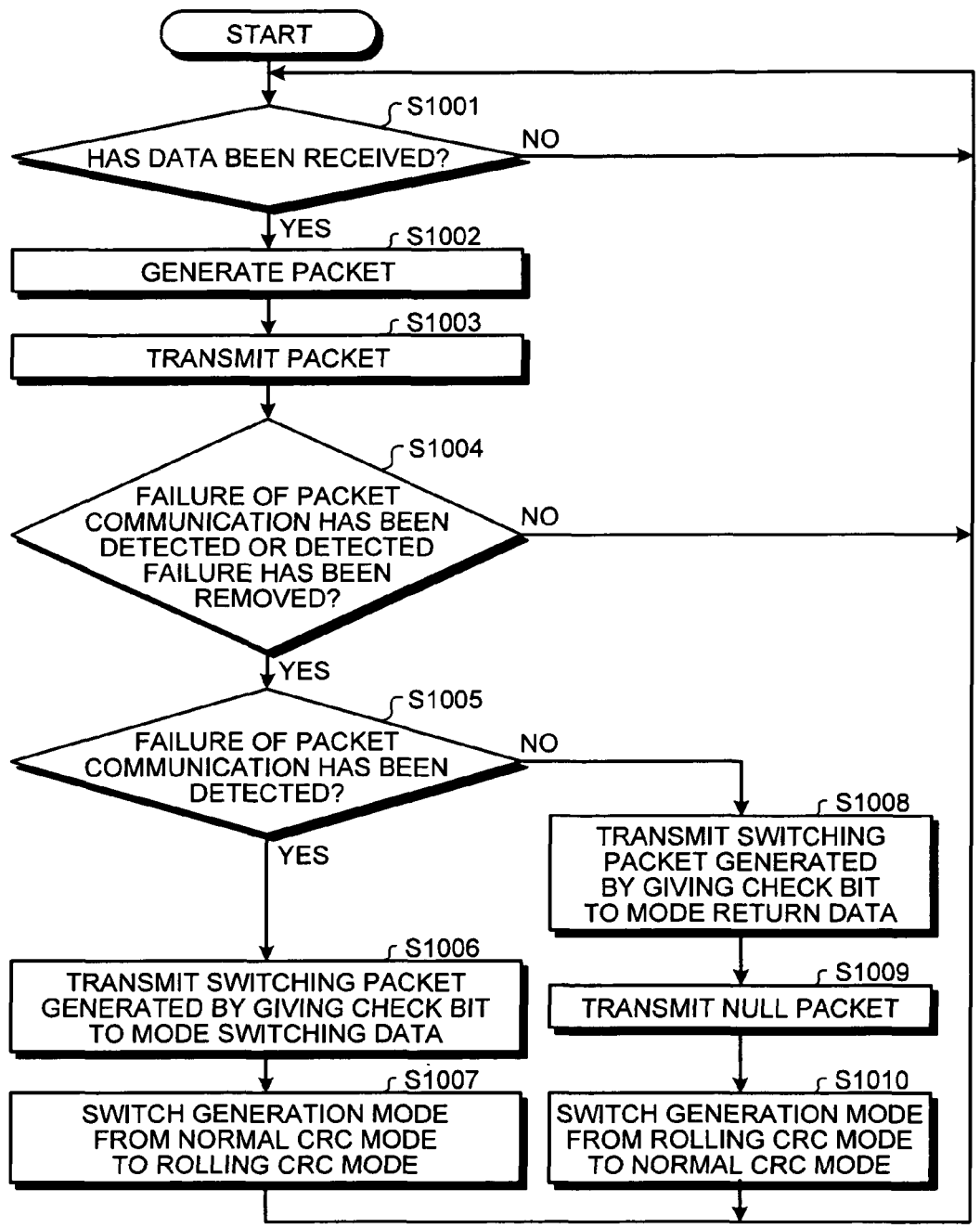
FIG. 6 is a flowchart illustrating a flow of a packet transmission process that is performed by the verification device according to the first embodiment.

Next, it will be explained about a process that is performed by the verification device 10 with reference to FIGS. 6 and 7. FIG. 6 is a flowchart illustrating a flow of a packet transmission process that is performed by the verification device according to the first embodiment. FIG. 7 is a flowchart illustrating a flow of a data verification process that is performed by the verification device according to the first embodiment. Hereinafter, it is assumed that the verification device 10 operates in accordance with the "normal CRC mode" at the start point of FIG. 6, in other words, that the failure of the transmission line that requires the switching of a verification mode does not occur at the time of driving the verification device 10. Moreover, it is assumed that a process that is performed by the verification device 10 is terminated when the drive of the verification device 10 is stopped.

Packet Transmission Process

First, it will be explained about the flow of the packet transmission process that is performed by the verification device 10 that is a packet transmission source, with reference to FIG. 6. As illustrated in FIG. 6, when receiving data (S1001: YES), the verification device 10 generates a packet by using the "normal CRC mode" (S1002).

Then, the verification device 10 transmits the generated packet (S1003). Subsequently, the verification device 10 determines whether or not the failure of the transmission line has been detected or whether or not the detected failure has been removed (S1004). When it is determined that the verification device 10 has not detected a failure or that the detected failure has not been removed, the verification device 10 again waits to receive data (S1004: NO).

When detecting the failure of the transmission line that requires the switching of a verification mode (S1004: YES, S1005: YES), the verification device 10 generates mode switching data and transmits a switching packet, which is generated by giving check bit to the mode switching data, to the device which is a packet transmission destination (S1006).

Next, the verification device 10 switches a generation mode from the "normal CRC mode" to the "rolling CRC mode" (S1007), and returns the process to S1001 to again wait to receive data.

On the other hand, when the failure of the transmission line that is being detected is removed (Step S1004: YES, Step S1005: NO), the verification device 10 generates mode return data and transmits a switching packet, which is generated by giving the check bit to the mode return data, to the device which is a packet transmission destination (S1008). Then, the verification device 10 transmits a null packet to the device that is the packet transmission destination, in addition to the switching packet (S1009).

Next, the verification device 10 switches the generation mode from the "rolling CRC mode" to the "normal CRC mode" (S1010), and returns the process to S1001 to again wait to receive data.

Data Verification Process

Next, it will be explained about the flow of the data verification process that is performed by the verification device 10 that receives a packet from another device with reference to FIG. 7. In an example illustrated in FIG. 7, it is assumed that the verification device 10 operates in accordance with the "normal CRC mode" at the process start point of FIG. 7. As illustrated in FIG. 7, when receiving a packet from a device that is a packet transmission source (S2001: YES), the verification device 10 verifies the presence or absence of error of data included in the packet (S2002). At an initial stage, the data verification of S2002 is performed in accordance with the "normal CRC mode".

Next, the verification device 10 analyzes the data included in the received packet, and determines whether mode switching data or mode return data is included in the packet (S2003).

In this case, when it is determined that the mode switching data or the mode return data is not included in the packet (S2003: NO), the verification device 10 transmits the received packet to the data processing unit (S2004), and returns the process to S2001 to again wait to receive a packet.

On the other hand, when it is determined that the mode switching data is included in the packet (S2003: YES, S2005: YES), the verification device 10 switches a verification mode from the "normal CRC mode" to the "rolling CRC mode" (S2006) and again waits to receive a packet (S2001).

In addition, when it is determined that the mode return data is included in the packet (S2003: YES, S2005: NO), the verification device 10 switches the verification mode from the "rolling CRC mode" to the "normal CRC mode" (S2007) and again waits to receive a packet (S2001).

Effect of First Embodiment

As described above, according to the first embodiment, the increase of a latency time can be suppressed while detection accuracy is maintained as needed. For example, because the verification device according to the first embodiment verifies the presence or absence of error of data in accordance with the "normal CRC mode" until the failure of a transmission line that requires the switching of a verification mode occurs, the increase of a latency time can be suppressed. Moreover, because the verification device according to the first embodiment verifies the presence or absence of error of data in accordance with the "rolling CRC mode" when the failure of a transmission line that requires the switching of a verification mode occurs, an error of the data can be detected with high accuracy.

Moreover, according to the first embodiment, a verification mode can be smoothly switched from the "rolling CRC mode" to the "normal CRC mode".

[b] Second Embodiment

However, the verification device 10 according to the first embodiment may have a problem that mode switching data and mode return data included in a switching packet may be damaged and a generation mode that is used in the verification device 10 that is a packet transmission source and a verification mode that is used in the verification device 10 that is a packet transmission destination may not be synchronized.

Therefore, according to the second embodiment, the verification device 10 that is a packet transmission destination informs the verification device 10 that is a packet transmission source of a verification mode for verifying the presence or absence of error of data by which the data verifying unit 34 performs verification, in order to synchronize a generation mode that is used in the verification device 10 of a packet transmission source and a verification mode that is used in the verification device 10 of a packet transmission destination.

Configuration of Verification Device by Second Embodiment

First, it will be explained about the configuration of the verification device 10 according to the second embodiment with reference to FIG. 8. FIG. 8 is a block diagram illustrating the configuration of the verification device according to the second embodiment. The configuration of the verification device 10 according to the second embodiment is different from that of the verification device 10 according to the first embodiment in that the verification device 10 according to the second embodiment newly includes a verification mode informing unit 35 in the receiving unit 30, and in the points described further below.

When the data verifying unit 34 determines that the data included in the packet received from the transmission-source verification device has an error, the verification mode informing unit 35 informs the verification device 10 which is a packet transmission source of a verification mode for verifying the presence or absence of error of the data by which the data verifying unit 34 performs verification.

To explain using a specific example, when the data verifying unit 34 determines that the mode switching data received from the transmission-source verification device has an error, the verification mode informing unit 35 informs the verification device 10 which is a packet transmission source that the data verifying unit 34 of the transmission-destination verification device verifies the presence or absence of error of the data by using the "normal CRC mode".

When receiving the notification of a verification mode from the verification device 10 which is a packet transmission destination, the generation mode switching unit 23 of the transmission-source verification device switches the generation mode used by the normal packet generating unit 24*a* to the verification mode informed from the transmission-destination verification device.

To explain using a specific example, when the notification indicating that the presence or absence of error of data is being verified by using the "normal CRC mode" is received from the verification device 10 which is a packet transmission destination while the transmission-source verification device operates in accordance with the "rolling CRC mode", the generation mode switching unit 23 of the transmission-source verification device switches the generation mode used by the packet generating unit 24 from the "rolling CRC mode" to the "normal CRC mode".

In addition, after the generation mode used by the normal packet generating unit 24*a* is switched to the verification mode informed from the transmission-destination verification device, the generation mode switching unit 23 may cause the switching packet generating unit 24*b* to retransmit the switching packet, which was transmitted to the transmission-destination verification device before switching the generation mode.

Process of Verification Device by Second Embodiment

Next, it will be explained about a process that is performed by the verification device according to the second embodiment with reference to FIGS. 9 and 10. Hereinafter, it will be explained about the details of the data verification process (see S2002 of FIG. 7) and a generation mode switching process when the notification of a verification mode is received.

FIG. 9 is a flowchart illustrating the flow of the data verification process that is performed by the verification device which is a packet transmission destination according to the second embodiment. FIG. 10 is a flowchart illustrating the flow of a generation mode switching process that is performed by the verification device which is a packet transmission source according to the second embodiment.

Data Verification Process

First, it will be explained about the flow of the data verification process that is performed by the verification device 10 that is a packet transmission destination with reference to FIG. 9. As illustrated in FIG. 9, when it is determined that the data included in the packet received from the transmission-source verification device does not have an error (S3001: NO), the transmission-destination verification device 10 terminates the data verification process (moves to S2003 of FIG. 7).

On the other hand, when it is determined that the data included in the packet received from the transmission-source verification device has an error (S3001: YES), the transmission-destination verification device 10 destroys the received packet (S3002).

Next, the transmission-destination verification device 10, informs the verification device 10 that is a packet transmission source of the verification mode for verifying the presence or absence of error of the data by which the data verifying unit 34 of the transmission-destination verification device 10 performs verification (S3003), and terminates the data verification process (moves to S2001 of FIG. 7).

Generation Mode Switching Process

Next, it will be explained about the flow of the generation mode switching process that is performed by the verification device 10 that is a packet transmission source with reference to FIG. 10. As illustrated in FIG. 10, when the notification of a verification mode is received from the verification device 10 that is a packet transmission destination (S4001: YES), the transmission-source verification device 10 switches the generation mode used by the normal packet generating unit 24a to the informed verification mode (S4002) and terminates the generation mode switching process.

Effect of Second Embodiment

As described above, according to the second embodiment, a verification mode is informed by a verification device which is a packet transmission destination to a verification device which is a packet transmission source, and thus the generation mode used by the verification device which is a packet transmission source and the verification mode used by the verification device which is a packet transmission destination can be synchronized with each other.

[c] Third Embodiment

In the second embodiment, it has been explained about the case where a verification mode for verifying the presence or absence of error of data by which the data verifying unit 34 performs verification is informed to the verification device 10 which is a packet transmission source, in order to synchronize the generation mode used by the verification device 10 which is a packet transmission source with the verification mode used by the verification device 10 which is a packet transmission destination. However, the generation mode used by the verification device 10 which is a packet transmission source and the verification mode used by the verification device 10 which is a packet transmission destination may be synchronized with each other by retransmitting a packet to the verification device 10 which is a packet transmission source.

Therefore, in the third embodiment, it will be explained about the case where a generation mode used by the verification device 10 which is a packet transmission source and a verification mode used by the verification device 10 which is a packet transmission destination are synchronized with each other by causing the verification device 10 which is a packet transmission source to retransmit a packet.

Configuration of Verification Device by Third Embodiment

Figure 11:
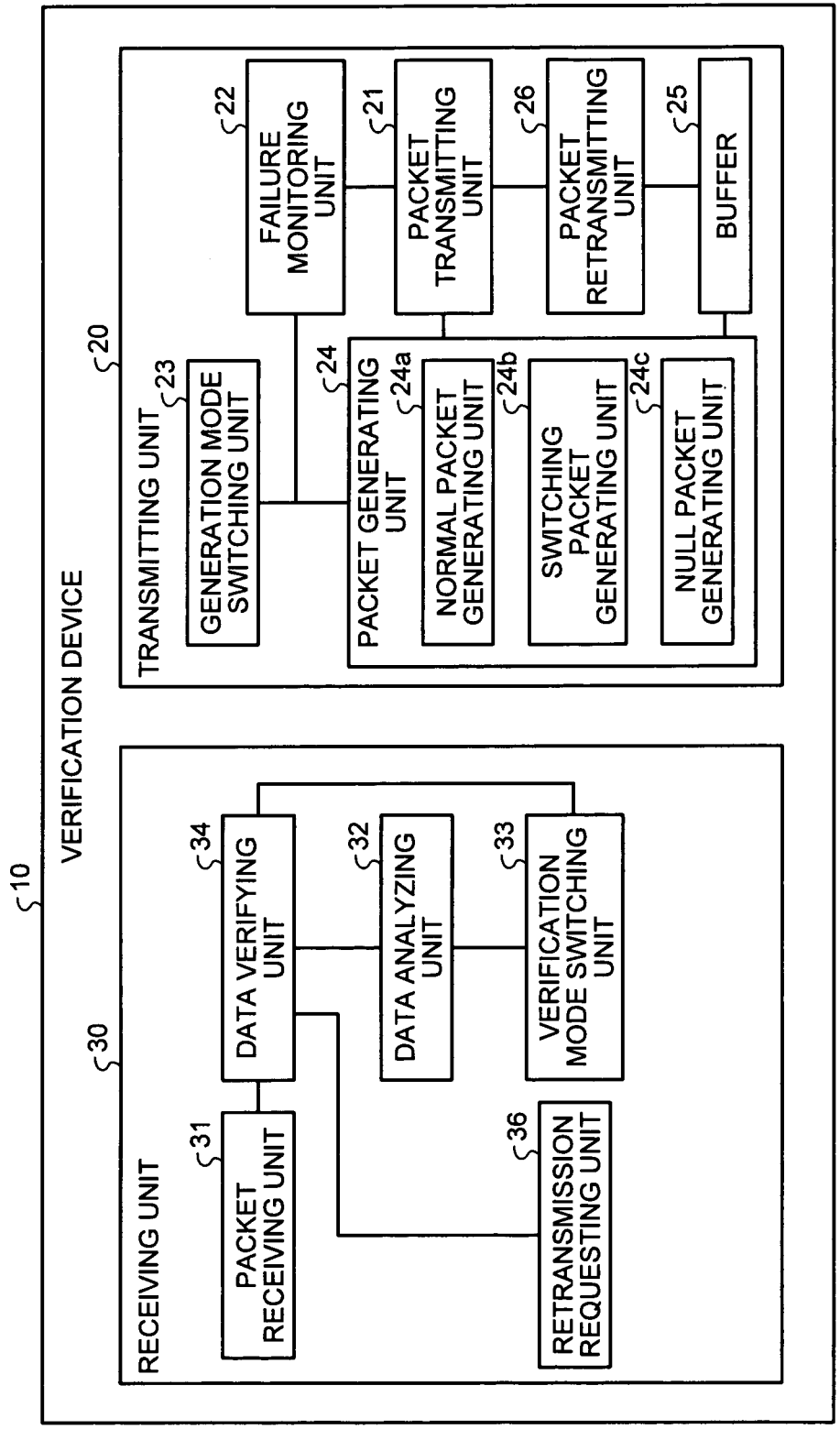
FIG. 11 is a block diagram illustrating the configuration of a verification device according to a third embodiment.
Figure 12A:
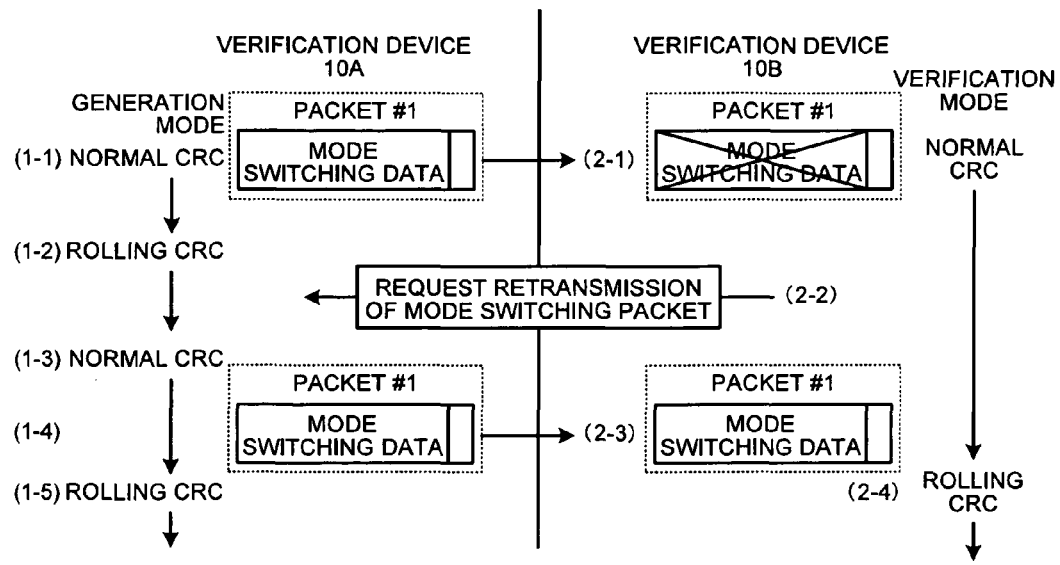
FIGS. 12A and 12B are diagrams explaining an example of a process that is performed by the verification device according to the third embodiment.
Figure 12B:
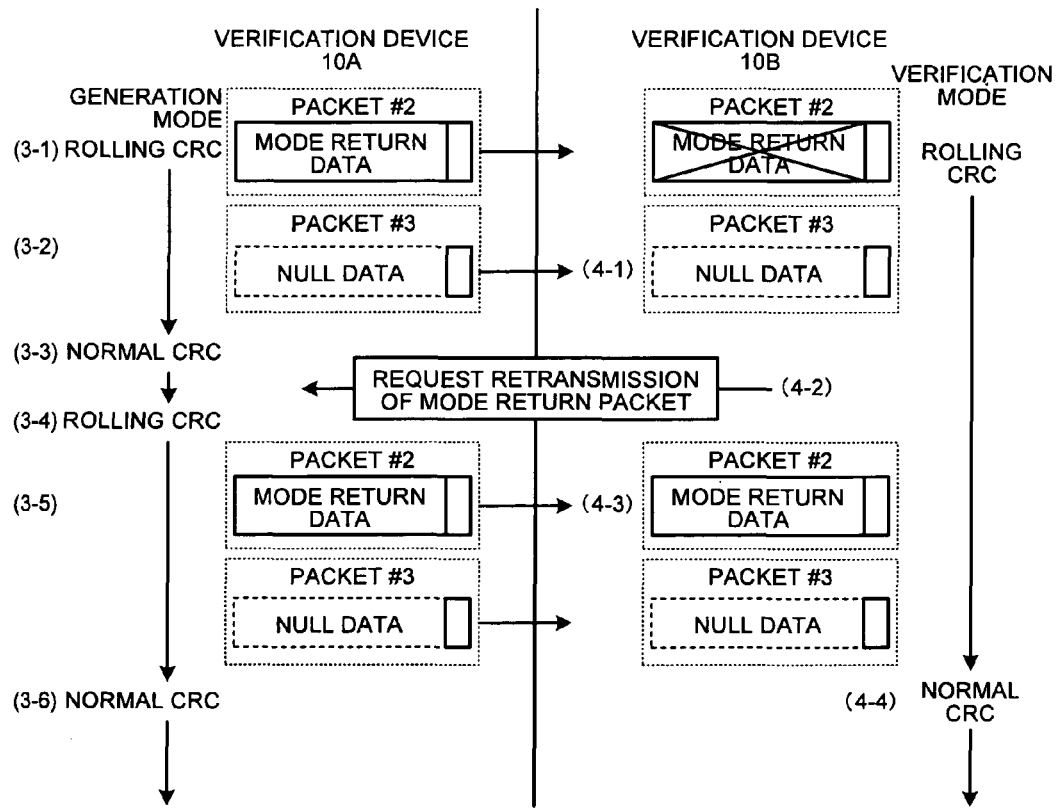

First, it will be explained about the configuration of the verification device 10 according to the third embodiment with reference to FIGS. 11, 12A, and 12B. FIG. 11 is a block diagram illustrating the configuration of the verification device according to the third embodiment. FIGS. 12A and 12B are diagrams explaining an example of a process that is performed by the verification device according to the third embodiment. The configuration of the verification device 10 according to the third embodiment is different from that of the verification device 10 according to the second embodiment in that the verification device 10 according to the third embodiment newly includes a retransmission requesting unit 36 in the receiving unit 30, and a buffer 25 and a packet retransmitting unit 26 in the transmitting unit 20. Other differences will be described below.

When the data verifying unit 34 determines that the data included in the packet received from the verification device which is a packet transmission source has an error, the retransmission requesting unit 36 requests the retransmission of the packet to the verification device 10 which is a packet transmission source.

To explain using a specific example, when the data verifying unit 34 determines that the mode switching data included in the mode switching packet received from the transmission-source verification device has an error, the retransmission requesting unit 36 transmits, to the verification device 10 that is a packet transmission source, packet identification information for identifying the mode switching packet and information indicating that the data verifying unit 34 of the transmission-destination verification device is verifying the presence or absence of error of data by using the "normal CRC mode", in order to request the retransmission of the mode switching packet.

Moreover, when the data verifying unit 34 determines that the mode return data included in the mode return packet received from the transmission-source verification device has an error, the retransmission requesting unit 36 transmits, to the verification device 10 which is a packet transmission source, packet identification information for identifying the mode return packet and information indicating that the data verifying unit 34 of the transmission-destination verification device verifies the presence or absence of error of data by using the "rolling CRC mode", in order to request the retransmission of the mode return packet.

The buffer 25 stores a packet that is generated by the packet generating unit 24. Specifically, when the normal packet generating unit 24a generates a packet by using the "normal CRC mode", the buffer 25 stores one packet that is generated by the packet generating unit 24.

Moreover, when the normal packet generating unit 24a generates a packet by using the "rolling CRC mode", the buffer 25 stores consecutive two packets that are generated by the packet generating unit 24.

When the request of the packet retransmission is received from the verification device 10 that is a packet transmission destination, the packet retransmitting unit 26 retransmits the packet stored in the buffer 25 to the transmission-destination verification device.

To explain using a specific example, when the request of the retransmission of a mode switching packet is received from the verification device 10 which is a packet transmission destination, the packet retransmitting unit 26 specifies a packet including mode switching data from packets stored in the buffer 25.

At this time, because the generation mode used by the packet generating unit 24 is switched from the "rolling CRC mode" to the "normal CRC mode", the packet retransmitting unit 26 generates check bit in accordance with the "normal CRC mode" by using the mode switching data included in the specified packet. Then, the packet retransmitting unit 26 again generates a switching packet that is obtained by giving the generated check bit to the mode switching data and retransmits the switching packet to the transmission-destination verification device.

Moreover, when the request of the retransmission of a mode return packet is received from the verification device 10 which is a packet transmission destination, the packet retransmitting unit 26 specifies a packet including mode return data and a packet including null data from the packets stored in the buffer 25.

At this time, because the generation mode used by the packet generating unit 24 is switched from the "normal CRC mode" to the "rolling CRC mode", the packet retransmitting unit 26 generates check bit in accordance with the "rolling CRC mode" by using the mode return data included in the specified packet. Then, the packet retransmitting unit 26 again generates a return packet by giving the generated check bit to the mode return data and retransmits the return packet to the transmission-destination verification device.

Next, the packet retransmitting unit 26 again generates a null packet that is obtained by giving the generated check bit to the null data included in the specified packet and retransmits the null packet to the transmission-destination verification device.

Hereinafter, it will be explained about a process that is performed by the verification device 10A and a process that is performed by the verification device 10B as a specific example for two situations when a packet is transmitted from the verification device 10A to the verification device 10B with reference to FIGS. 12A and 12B.

Situation 1

When a packet is stored in the buffer 25 of the verification device 10A while the packet generating unit 24 of the verification device 10A receives a normal signal from the failure monitoring unit 22, the normal packet generating unit 24a generates a packet by using the "normal CRC mode". Next, the normal packet generating unit 24a of the verification device 10A transmits the generated packet to the verification device 10B.

In this case, it is assumed that the packet generating unit 24 of the verification device 10A receives a failure signal from the failure monitoring unit 22 of the verification device 10A. At this time, as illustrated in (1-1) of FIG. 12A, the switching packet generating unit 24b of the verification device 10A generates a packet #1 including mode switching data by using the "normal CRC mode".

Next, the switching packet generating unit 24b of the verification device 10A transmits the packet #1 to the verification device 10B. At this time, the buffer 25 of the verification device 10A stores therein the packet #1 that is generated by the switching packet generating unit 24b.

Then, as illustrated in (1-2) of FIG. 12A, the generation mode switching unit 23 of the verification device 10A switches the generation mode used by the normal packet generating unit 24a from the "normal CRC mode" to the "rolling CRC mode".

On the other hand, as illustrated in (2-1) of FIG. 12A, when receiving the packet #1 transmitted from the verification device 10A at (1-1), the data verifying unit 34 of the verification device 10B determines the presence or absence of the mode switching data included in the packet #1 and verifies the presence or absence of error of the mode switching data when the mode switching data is included in the packet #1.

When the data verifying unit 34 of the verification device 10B determines that the mode switching data included in the packet #1 has an error, the retransmission requesting unit 36 of the verification device 10B requests the retransmission of a mode switching packet, which includes information indicating that the presence or absence of error of data is verified by using the "normal CRC mode", to the verification device 10A as illustrated in (2-2) of FIG. 12A.

As illustrated in (1-3) of FIG. 12A, when the request of the retransmission of a mode switching packet including the information indicating that the presence or absence of error of data is verified by using the "normal CRC mode" is received from the verification device 10B of (2-2), the generation mode switching unit 23 of the verification device 10A switches the generation mode used by the packet generating unit 24 from the "rolling CRC mode" to the "normal CRC mode".

Then, as illustrated in (1-4) of FIG. 12A, the packet retransmitting unit 26 of the verification device 10A retransmits the packet #1 including the mode switching data stored in the buffer 25 to the verification device 10B. In this case, the packet #1 that is retransmitted to the verification device 10B is a packet transmitted to the verification device 10B at (1-1).

Then, as illustrated in (1-5) of FIG. 12A, the generation mode switching unit 23 of the verification device 10A again switches the generation mode used by the normal packet generating unit 24a from the "normal CRC mode" to the "rolling CRC mode".

As illustrated in (2-3) of FIG. 12A, when receiving the packet #1 from the verification device 10A, the data verifying unit 34 of the verification device 10B verifies the presence or absence of error of the mode switching data included in the packet #1.

In this case, as illustrated in (2-4) of FIG. 12A, when the data verifying unit 34 of the verification device 10B determines that the mode switching data included in the packet does not have an error, the verification mode of the verification device 10B is changed from the "normal CRC mode" to the "rolling CRC mode".

Situation 2

When the packet generating unit 24 of the verification device 10A receives a normal signal from the failure monitoring unit 22, the switching packet generating unit 24b of the verification device 10A generates a packet #2 including mode return data by using the "rolling CRC mode" as illustrated in (3-1) of FIG. 12B. Then, the switching packet generating unit 24b of the verification device 10A transmits the packet #2 to the verification device 10B.

Next, as illustrated in (3-2) of FIG. 12B, the null packet generating unit 24c of the verification device 10A generates a packet #3 which contains no data by using the "rolling CRC mode". Then, the null packet generating unit 24c of the verification device 10A transmits the packet #3 to the verification device 10B. At this time, the buffer 25 of the verification device 10A stores therein the packet #2 and the packet #3.

Then, as illustrated in (3-3) of FIG. 12B, the generation mode switching unit 23 of the verification device 10A switches the generation mode used by the normal packet generating unit 24a from the "rolling CRC mode" to the "normal CRC mode".

As illustrated in (4-1) of FIG. 12B, when the packet #3 transmitted from the verification device 10A at (3-2) is received, the data verifying unit 34 of the verification device 10B determines the presence or absence of the mode return data included in the packet #2 received from the verification device 10A at (3-1) and verifies the presence or absence of error of the mode return data when the mode return data is included in the packet #2.

When the data verifying unit 34 of the verification device 10B determines that the mode return data included in the packet #2 has an error, the retransmission requesting unit 36 of the verification device 10B requests the retransmission of a packet, which includes information indicating that the presence or absence of error of data is verified by using the "rolling CRC mode", to the verification device 10A as illustrated in (4-2) of FIG. 12B.

As illustrated in (3-4) of FIG. 12B, when the request of the retransmission of a mode return packet including information indicating that the presence or absence of error of data is verified by using the "rolling CRC mode" is received from the verification device 10B of (4-2), the generation mode switching unit 23 of the verification device 10A switches the generation mode used by the packet generating unit 24 from the "normal CRC mode" to the "rolling CRC mode".

Next, as illustrated in (3-5) of FIG. 12B, the packet retransmitting unit 26 of the verification device 10A retransmits the packet #2 including the mode return data stored in the buffer 25 and the packet #3 that is a null packet to the verification device 10B. The retransmitted packet #2 and packet #3 are the packets that are generated in accordance with the "rolling CRC mode" and transmitted to the verification device 10B at (3-1) and (3-2).

Then, as illustrated in (3-6) of FIG. 12B, the generation mode switching unit 23 of the verification device 10A again switches the generation mode used by the normal packet generating unit 24a from the "rolling CRC mode" to the "normal CRC mode".

As illustrated in (4-3) of FIG. 12B, when the packet #2 and the packet #3 are received from the verification device 10A, the data verifying unit 34 of the verification device 10B verifies the presence or absence of error of the mode return data included in the packet #2.

When the data verifying unit 34 of the verification device 10B determines that the mode return data included in the packet does not have an error, the verification mode of the verification device 10B is changed from the "rolling CRC mode" to the "normal CRC mode" as illustrated in (4-4) of FIG. 12B.

Process of Verification Device by Third Embodiment

Next, it will be explained about a process that is performed by the verification device according to the third embodiment with reference to FIGS. 13 and 14. A packet transmission process that is performed by the verification device according to the third embodiment is similar to the flow of the packet transmission process illustrated in FIG. 6 except that the generated packet is stored. Hereinafter, it will be explained about the details of a data verification process (see S2002 of FIG. 7) and a retransmission process when receiving the request of the retransmission of a packet.

Figure 13:
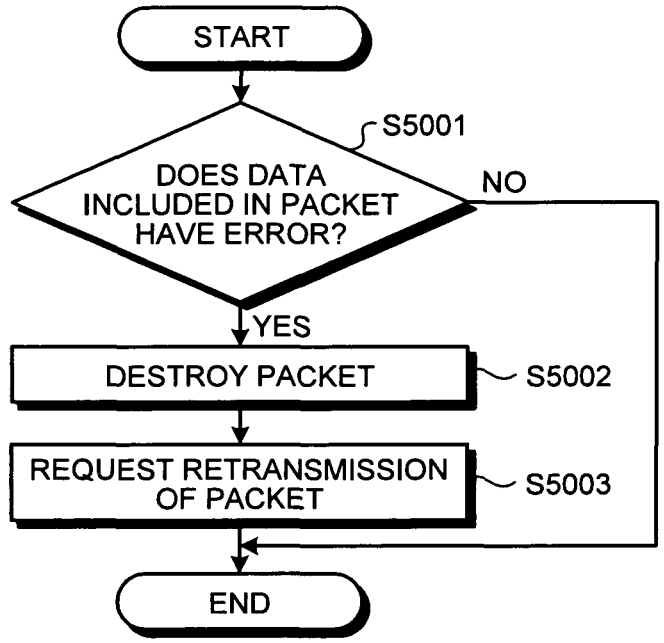
FIG. 13 is a flowchart illustrating a flow of a data verification process that is performed by the verification device according to the third embodiment.
Figure 14:
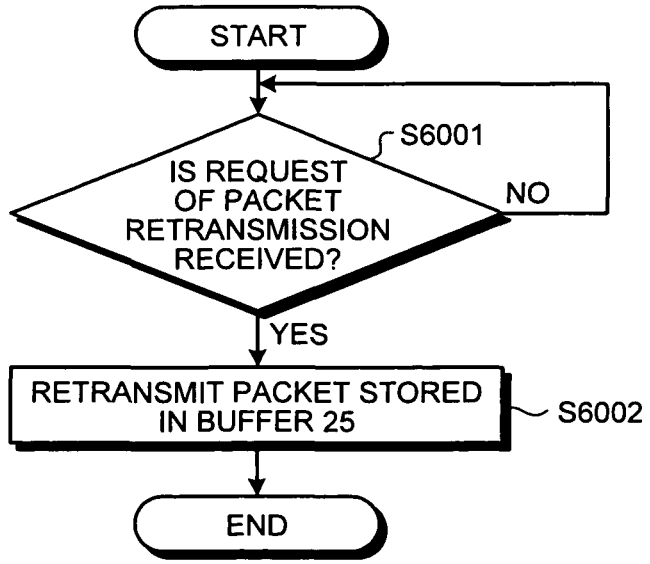
FIG. 14 is a flowchart illustrating a flow of a retransmission process that is performed by the verification device according to the third embodiment.

FIG. 13 is a flowchart illustrating the flow of a data verification process that is performed by the verification device which is a packet-transmission-destination device according to the third embodiment. FIG. 14 is a flowchart illustrating the flow of a retransmission process that is performed by the verification device which is a packet-transmission-source device according to the third embodiment.

Data Verification Process

As illustrated in FIG. 13, when it is determined that the data included in the packet received from the transmission-source verification device does not have an error (S5001: NO), the transmission-destination verification device 10 terminates the data verification process (moves to Step S2003 of FIG. 7).

On the other hand, when it is determined that the data included in the packet received from the transmission-source verification device has an error (S5001: YES), the transmission-destination verification device 10 destroys the received packet (S5002).

Next, the transmission-destination verification device 10 requests the retransmission of a packet to the verification device 10 which is a packet transmission source (S5003), and terminates the data verification process (moves to S2001 of FIG. 7).

Retransmission Process

Next, it will be explained about the flow of a packet retransmission process that is performed by the transmission-source verification device 10 with reference to FIG. 14. As illustrated in FIG. 14, when the request of the retransmission of a packet is received from the verification device 10 which is a packet transmission destination (S6001: YES), the verification device 10 retransmits a packet stored in the buffer 25 to the transmission-destination verification device (S6002) and terminates the data verification process.

Effect of Third Embodiment

As described above, according to the third embodiment, a packet is retransmitted from the packet-transmission-destination verification device to the verification device 10 which is a packet transmission source and thus a generation mode used by the verification device that is a packet transmission source and a verification mode used by the verification device which is a packet transmission destination can be synchronized with each other.

[d] Fourth Embodiment

It has been explained about the first to third embodiments. The present invention may be realized by various different configurations in addition to the embodiments described above. Therefore, it will be below explained about another embodiment as the fourth embodiment.

For example, in the first embodiment, it has been explained about a case where the present invention is applied to the verification device 10 that transmits and receives a packet. The transmitting unit 20 and the receiving unit 30 of the verification device 10 according to the first embodiment may be mounted on separate devices.

Moreover, processing procedures, control procedures, specific titles, and information (for example, the configuration of check bit and the configuration of a packet) including various types of data and parameters, which are described in the description heretofore and the drawings, can be arbitrarily changed if not otherwise specified.

Moreover, each component of each device illustrated in the drawings is a functional concept. Therefore, these components are not necessarily constituted physically as illustrated in the drawings. In other words, the specific configuration of dispersion/integration of each device is not limited to the illustrated configuration. Therefore, all or a part of each device can dispersed or integrated functionally or physically in an optional unit in accordance with various types of loads or operating conditions. For example, the switching packet generating unit 24b and the null packet generating unit 24c illustrated in FIG. 2 can be integrated.

Furthermore, all or a part of the process functions performed by each device may be realized by a CPU and a program that is analyzed and executed by the CPU, or may be realized by a hardware by wired logic.

Figure 15:
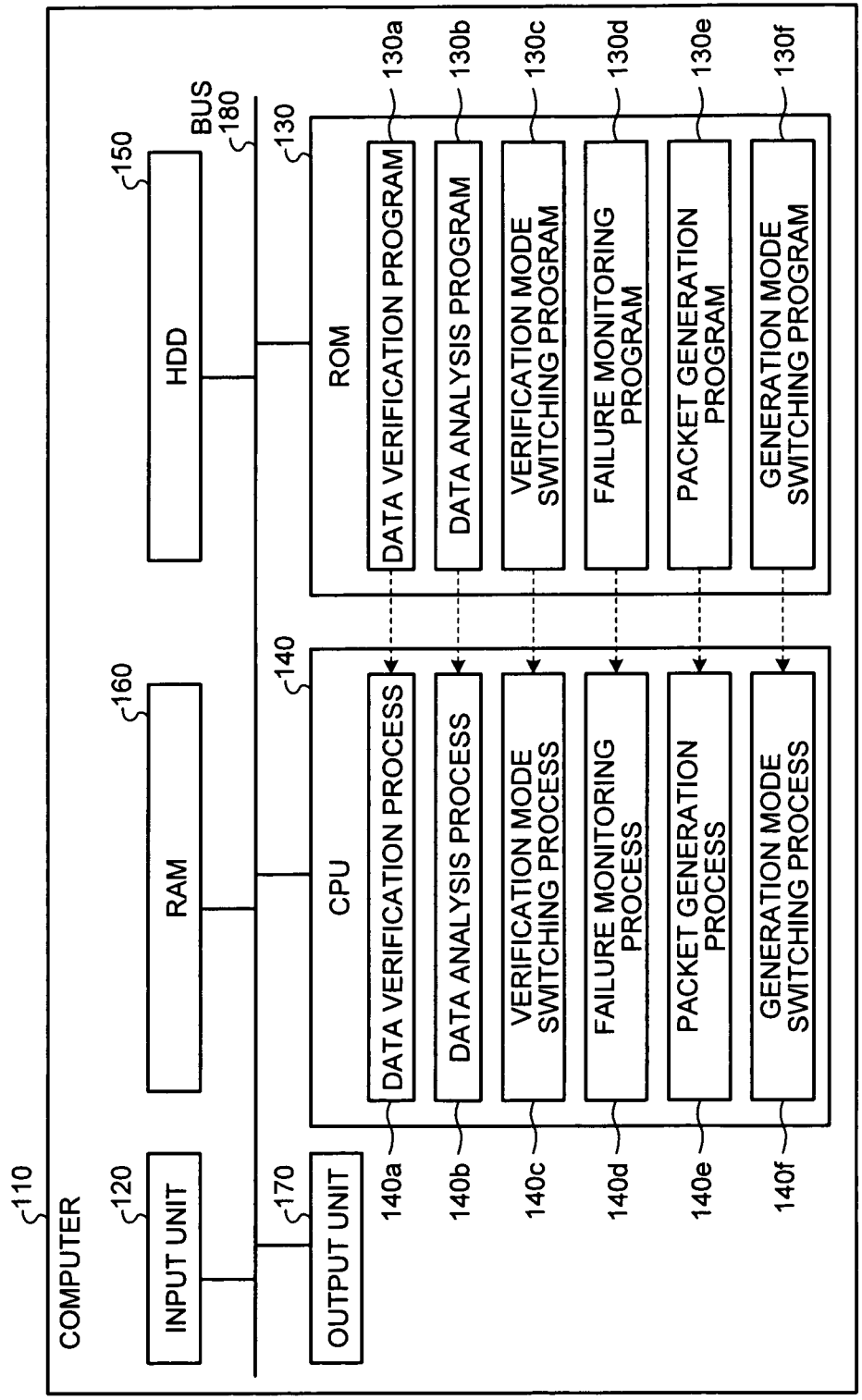
FIG. 15 is a diagram illustrating a computer that executes a verification program.

However, the present invention may be realized by executing a previously-prepared program with a computer that functions as the verification device 10. Therefore, as an example, it will be below explained about a computer that executes a verification program having the same function as that of the verification device 10 of the embodiments with reference to FIG. 15. FIG. 15 is a diagram illustrating a computer 110 that executes a verification program.

As illustrated in FIG. 15, the computer 110 that functions as the verification device 10 includes an input unit 120, a ROM 130, a CPU 140, an HDD 150, a RAM 160, and an output unit 170, which are connected by a bus 180.

The ROM 130 previously stores therein a verification program having the same function as that of the verification device 10 according to the first embodiment, that is, a data verification program 130a, a data analysis program 130b, a verification mode switching program 130c, a failure monitoring program 130d, a packet generation program 130e, and a generation mode switching program 130f, as illustrated in FIG. 15. The programs 130a to 130f may be appropriately integrated or dispersed similarly to the units of the verification device 10 illustrated in FIG. 2.

Moreover, the CPU 140 reads out and executes the programs 130a to 130f from the ROM 130, and thus the programs 130a to 130f function as a data verification process 140a, a data analysis process 140b, a verification mode switching process 140c, a failure monitoring process 140d, a packet generation process 140e, and a generation mode switching process 140f, as illustrated in FIG. 15. The processes 140a to 140f respectively correspond to the data verifying unit 34, the data analyzing unit 32, the verification mode switching unit 33, the failure monitoring unit 22, the packet generating unit 24, and the generation mode switching unit 23, which are illustrated in FIG. 2.

Moreover, the programs 130a to 130f may not necessarily be stored in the ROM 130 from the start. For example, the programs may be stored in a "transportable physical medium" such as a flexible disk (FD), CD-ROM, a DVD disc, a magneto-optical disk, or an IC card that is inserted into the computer 110, a "fixed physical medium" such as an HDD that is provided inside and outside the computer 110, or "other computers" (or servers) that are connected to the computer 110 via public lines, Internet, LAN, WAN, or the like and be read out and executed by the computer 110.

Furthermore, the verification method described in the present embodiments can be realized by executing a program prepared beforehand with a computer such as a personal computer or a workstation. The program can be distributed via a network such as Internet. Moreover, the program can be recorded in a recording medium, which can be read by a computer, such as a hard disk, a flexible disk (FD), a CD-ROM, an MO, or a DVD and can be executed by being read from the recording medium by the computer.

As described above, according to an aspect of the present invention, the increase of a latency time can be suppressed while maintaining a detection accuracy as needed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A verification device comprising:
a data verifying unit that verifies a presence or absence of an error of data included in a packet by using one of a first verification mode for verifying a presence or absence of an error of data included in a first packet received and a second verification mode for verifying a presence or absence of an error of data included in a second packet received immediately before the first packet;
a packet generating unit that generates a packet by using one of a first packet generation mode for generating a packet corresponding to the first verification mode and a second packet generation mode for generating a packet corresponding to the second verification mode;
a failure monitoring unit that monitors whether a failure of a transmission line that requires a switching of the verification mode occurs;
a switching packet transmitting unit that transmits, to a first verification device, which is a packet transmission destination, a switching packet for informing of the switching of the verification mode that is used by the data verifying unit when the failure monitoring unit detects an occurrence of a failure or a removal of a failure;
a generation mode switching unit that switches the generation mode that is used by the packet generating unit; and
a verification mode switching unit that switches the verification mode that is used by the data verifying unit to the verification mode informed by the switching packet when receiving the switching packet, wherein
the switching packet transmitting unit transmits the switching packet including data for switching the verification mode from the second verification mode to the first verification mode and subsequently transmits a null packet in which data is not stored.

2. The verification device according to claim 1, further comprising a verification mode informing unit that, when the data verifying unit verifies that the data included in the switching packet has an error, informs a second verification device, which is a packet transmission source, of a verification mode which the data verifying unit uses at present, wherein
the verification mode switching unit does not switch the verification mode that is used by the data verifying unit when the data verifying unit verifies that the data included in the switching packet has the error.

3. The verification device according to claim 1, further comprising a verification mode informing unit that informs a second verification device, which is a packet transmission source, of a verification mode to be used by the data verifying unit when the data verifying unit verifies that the data included in the packet has an error,
wherein the generation mode switching unit switches, when a notification of the verification mode is received from the first verification device, which is the packet transmission destination, the generation mode that is used by the packet generating unit to a generation mode corresponding to the informed verification mode.

4. The verification device according to claim 1, further comprising:
a packet storing unit that stores therein the packet that is generated by the packet generating unit, the switching packet transmitting unit, or both;
a retransmission requesting unit that requests a retransmission of a packet to the second verification device, which is a packet transmission source, when the data verifying unit verifies that the data included in the packet has an error; and a packet retransmitting unit that retransmits the packet that is stored in the packet storing unit when receiving a request of retransmission of the packet from the retransmission requesting unit of the first verification device, which is a packet transmission destination.

5. A verification method comprising:

verifying a presence or absence of an error of data included in a packet by using one of a first verification mode for verifying a presence or absence of an error of data included in a first packet and a second verification mode for verifying a presence or absence of an error of data included in a second packet received immediately before the first packet;

generating a packet by using one of a first packet generation mode for generating a packet corresponding to the first verification mode and a second packet generation mode for generating a packet corresponding to the second verification mode;

monitoring whether a failure of a transmission line that requires a switching of the verification mode occurs;

transmitting a switching packet including data for switching the verification mode that is used at the verifying to a first verification device, which is a packet transmission destination, when an occurrence of a failure or a removal of a failure is detected in the monitoring;

switching the generation mode that is used at the generating when the switching packet is transmitted at the transmitting; and switching the verification mode that is used at the verifying when the switching packet is received, wherein the transmitting includes transmitting the switching packet including data for switching the verification mode from the second verification mode to the first verification mode and subsequently transmitting a null packet in which data is not stored.

6. A computer readable storage medium having stored therein a verification program for transmitting a generated packet and verifying a presence or absence of an error of data included in a received packet, the verification program causing a computer to execute a process comprising:

verifying a presence or absence of an error of data included in a packet by using one of a first verification mode for verifying a presence or absence of an error of data included in a first packet and a second verification mode for verifying a presence or absence of an error of data included in a second packet received immediately before the first packet;

generating a packet by using one of a first packet generation mode for generating a packet corresponding to the first verification mode and a second packet generation mode for generating a packet corresponding to the second verification mode;

monitoring whether a failure of a transmission line that requires a switching of the verification mode occurs;

transmitting a switching packet including data for switching the verification mode that is used at the verifying to a first verification device, which is a packet transmission destination, when an occurrence of a failure or a removal of a failure is detected in the monitoring;

switching the generation mode that is used at the generating when the switching packet is transmitted at the transmitting; and switching the verification mode that is used at the verifying when the switching packet is received, wherein the transmitting includes transmitting the switching packet including data for switching the verification mode from the second verification mode to the first verification mode and subsequently transmitting a null packet in which data is not stored.

* * * * *